United States Patent
Vyas et al.

(12)

(10) Patent No.: US 8,022,572 B2
(45) Date of Patent: Sep. 20, 2011

(54) GENSET SYSTEM WITH ENERGY STORAGE FOR TRANSIENT RESPONSE

(75) Inventors: Parag Vyas, Munich (DE); Amol Rajaram Kolwalkar, Bangalore (IN); Johannes Huber, Munich (DE)

(73) Assignee: General Electric Company, Niskayuna, NY (US)

( * ) Notice: Subject to any disclaimer, the term of this patent is extended or adjusted under 35 U.S.C. 154(b) by 213 days.

(21) Appl. No.: 12/427,783

(22) Filed: Apr. 22, 2009

(65) Prior Publication Data

US 2010/0270864 A1 Oct. 28, 2010

(51) Int. Cl.
*H02J 9/00* (2006.01)
(52) U.S. Cl. .......................................................... 307/66
(58) Field of Classification Search .................. 307/66
See application file for complete search history.

(56) References Cited

U.S. PATENT DOCUMENTS

2004/0145188 A1* 7/2004 Janssen et al. .................. 290/44
2009/0140576 A1* 6/2009 Yu et al. ........................... 307/66

FOREIGN PATENT DOCUMENTS

WO 2004/038892 A2 5/2004
WO 2008/063580 A2 5/2008

OTHER PUBLICATIONS

Samuel Beaudoin and Christian McMahon; White Paper On: Variable Speed Gensets—"Reduce Fuel Consumption & Optimize Engine Performance"; Available from Internet:<www.cvtcorp.com>; 11Pages.

* cited by examiner

*Primary Examiner* — Robert L. Deberadinis
(74) *Attorney, Agent, or Firm* — Ann M. Agosti

(57) ABSTRACT

A power generating system having a variable speed genset is provided. The variable speed genset includes an engine and a variable speed generator. The variable speed generator is mechanically coupled to the engine and is configured to generate electrical power. The power generating system further includes an energy storage device, which is charged or discharged during transient load conditions of a power grid. The power generating system includes a controller to generate a speed control signal to select a speed for the genset. The speed control signal is selected based upon stored energy in the energy storage device and power generating system conditions, power grid conditions or combinations thereof.

21 Claims, 4 Drawing Sheets ized or discharged during transient load conditions of a power grid. The system further includes an auxiliary machine mechanically coupled to the engine and a converter configured to couple the energy storage device to the auxiliary machine. A controller generates a converter control signal to control supply of power from the energy storage device to the auxiliary machine based upon stored energy in the energy storage device and power generating system conditions, power grid conditions, or combinations thereof.

GENSET SYSTEM WITH ENERGY STORAGE FOR TRANSIENT RESPONSE

BACKGROUND

The present invention relates generally to an engine-generator set (genset), and, more particularly, to an operation of the genset during transient conditions.

Gensets are used to supply electrical power in places where utility (central station) power is not available, or where power is needed only temporarily. Currently, gensets typically include engines connected directly to generators to produce electricity. In some cases the generators are permanently installed and kept ready to supply power to critical loads during temporary interruptions of the utility power supply. Typically the gensets operate at a fixed speed to produce electricity at a grid frequency. The fixed speed may typically be 1500 rpm for a 50 Hz grid frequency or 1800 (or 1200) rpm for a 60 Hz grid frequency.

For low power engines, such as engines operating below about 25 KW, higher speeds are typically possible as are higher output power and higher efficiency. However, operation of the engine at very high speeds is not practical when the genset needs to generate electricity at a fixed grid frequency. In some cases, the output power required from the genset is below a rated value while the engine is still running at a fixed speed. This results in reduction in the engine efficiency. In islanded grids, the engine efficiency may be improved by reducing the engine speed and hence reducing the fuel consumption. However, the genset frequency may then drop below an acceptable value of the grid frequency.

A variable speed genset may be used to improve the efficiency of the engine. Other advantages of variable speed gensets are reduced fuel consumption, reduced noise, prolonged engine life, and reduced emissions. One challenge for variable speed gensets as well as for fixed speed gensets is that, when there is a step change or a step increase in a load on the genset, the engine may take time to accelerate to its required speed. The time delay may result in poor transient performance or poor transient response of the engine. A variable geometry turbocharger is sometimes used to improve the transient response of the engine. However, such turbochargers are expensive and are not easily obtainable.

Therefore, it would be desirable to have a system and a method that will address the foregoing issues.

BRIEF DESCRIPTION

In accordance with one exemplary embodiment of the present invention, a power generating system is provided. The system includes a variable speed genset, having an engine and a variable speed generator. The variable speed generator is mechanically coupled to the engine and is configured to generate electrical power. The system also includes an energy storage device. The energy storage device is charged or discharged during transient load conditions of a power grid. The system further includes a controller to generate a speed control signal to select a speed for the genset based upon stored energy in the energy storage device and power generating system conditions, power grid conditions or combinations thereof.

In accordance with another exemplary embodiment of the present invention, a power generating system is provided. The power generating system includes a genset, wherein an engine and a generator mechanically coupled to the engine and configured to generate electrical power is provided. The system also includes an energy storage device, which is charged or discharged during transient load conditions of a power grid. The system further includes an auxiliary machine mechanically coupled to the engine and a converter configured to couple the energy storage device to the auxiliary machine. A controller generates a converter control signal to control supply of power from the energy storage device to the auxiliary machine based upon stored energy in the energy storage device and power generating system conditions, power grid conditions, or combinations thereof.

In accordance with yet another embodiment of the present invention, a method for use in a power generation system for supplying stored energy from an energy storage device to a genset is provided. The genset includes an engine and a generator coupled to it. The method includes obtaining energy signals indicative of stored energy in the energy storage device. The method also includes obtaining condition signals indicative of power generation system conditions, power grid conditions, or combinations thereof. The method further includes controlling engine control signals to select a speed for the engine and storage control signals to charge or discharge the energy storage device based upon the storage and condition signals.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention function to provide a system to control a variable speed genset connected power generating system. The system includes a genset with an energy storage device and a power electronic converter interface to a power grid or a power generating system. Although the present discussion focuses on a genset system, the present invention is applicable to any power generating system with a controllable or uncontrollable input energy source and a power electronic converter interface.

Figure 1:
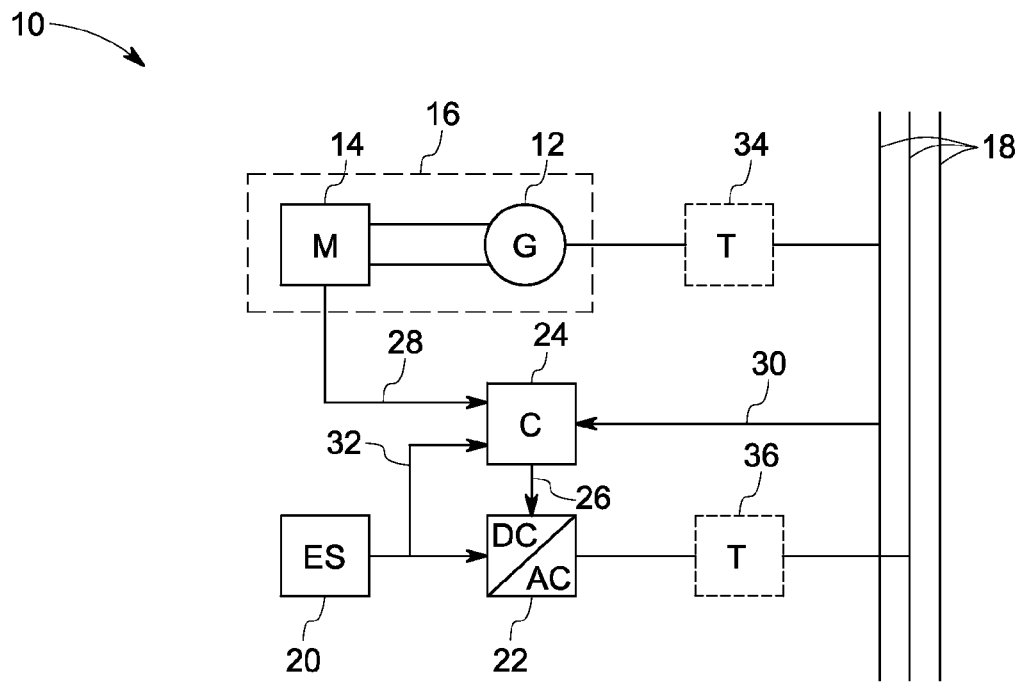
FIG. 1 is a diagrammatical representation of a genset system with an energy storage device connected to the power grid.

FIG. 1 shows a genset system 10 with an energy storage device connected to the power grid. A generator 12 is mechanically coupled to an internal combustion (IC) engine 14. The generator 12 and the engine 14 together form a genset 16. In one embodiment, the generator comprises a synchronous generator. In another embodiment, the internal combustion engine comprises a natural gas engine or a diesel engine. The generator 12 is electrically connected to the power grid 18 to which electrical loads (not shown) such as residential loads and industrial loads are connected. As described earlier, the rated rotational speed of the IC engine and the generator is typically 1500 rpm for 50 Hz grid applications or 1800 (or 1200) rpm for 60 Hz applications. In one embodiment, the system 10 may be used in an islanded grid. When the system 10 is used in the islanded grid, fluctuations in electrical loads connected to the grid cause a fluctuation of engine speed, which translates into a fluctuation of the grid frequency. In another embodiment, where the system 10 is connected to the grid, the engine 14 may be commanded to track a reference power demand signal with high bandwidth. The engine may not be able to track such a reference signal due to limitations of the engine dynamic response. As the electrical loads are rated for a fixed frequency, fluctuations in the grid frequency are harmful to the performance of electrical loads connected to the grid. Hence, an energy storage device 20 connected to an energy storage (ES) converter 22 may also be coupled to the power grid. In one embodiment, the energy storage device comprises a supercapacitor. As will be appreciated by those skilled in the art, supercapacitors offer very high capacitance in a small package. In another embodiment, the energy storage device may be a battery storage or a direct current (DC) flywheel. The energy storage device 20 is charged or discharged during times of transient load change to reduce the impact of load changes on the genset. Thus, the IC engine speed deviations remain within defined limits and the harmful consequences of frequency variations on the grid-connected loads are avoided. In one embodiment, the energy storage converter 22 includes power electronic devices such as Insulated Gate Bipolar Transistors (IGBTs). A controller 24 provides control signals 26 to the ES converter 22 to control its output voltage amplitude, output voltage frequency and phase and thus to control the output current of the ES converter 22. The controller 24 generates the control signals 26 based on IC engine parameters 28, grid voltage 30 and the energy storage device parameters 32. In one embodiment, the IC engine parameter includes IC engine speed. In another embodiment, the energy storage device parameter 32 includes status of charge and current from the energy storage device. In another embodiment, transformers 34, 36 are used to step up the output voltage of the generator 12 and the ES converter 22 to match it to the grid voltage. This embodiment responds more slowly to transient events than is desired for certain applications.

Figure 2:
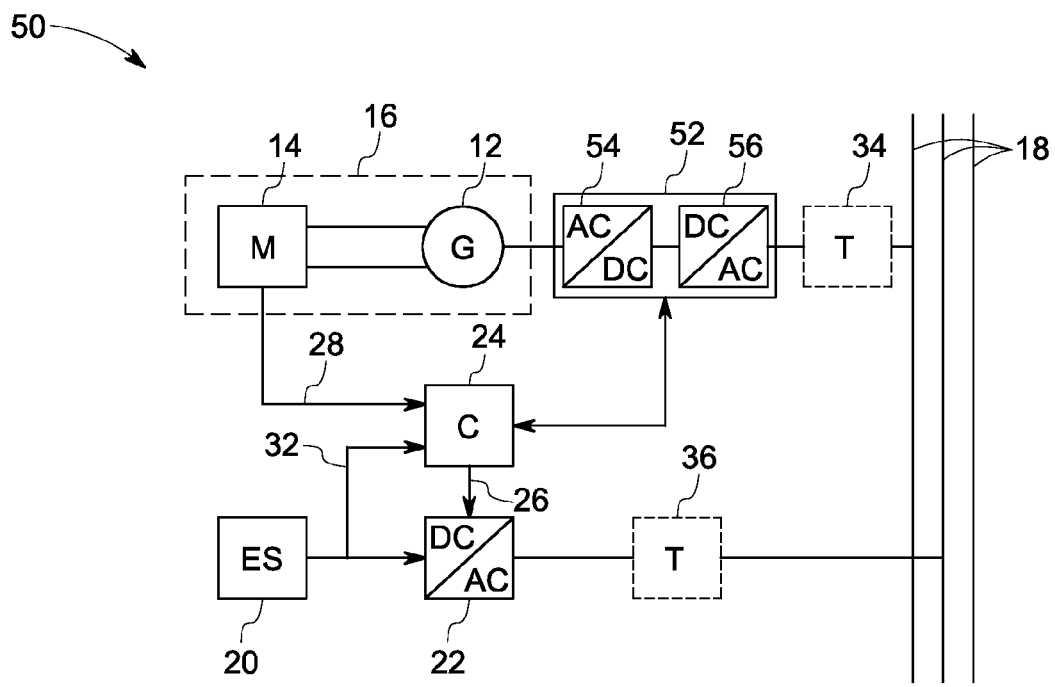
FIG. 2 is a diagrammatical representation of a variable speed genset system with an energy storage device connected to the power grid in accordance with an embodiment of the present invention.

FIG. 2 shows a variable speed genset system 50 with an energy storage device connected to the power grid for transient response in accordance with an embodiment of the present invention. The genset 16 includes a synchronous generator 12 mechanically coupled to the IC engine 14, and the system 50 further includes the energy storage device 20 connected to the power grid 18 through the energy storage converter 22. In the embodiment of FIG. 2, a variable speed generator (VSG) converter 52 is included in the genset system. In one embodiment, the VSG converter comprises power electronic components such as IGBTs and includes a rectifier stage 54 and an inverter stage 56. The rectifier stage 54 converts the alternating current (AC) power from the generator 12 to direct current (DC) power. The inverter stage 56 converts the DC power back to AC power and feeds it to the power grid 18 at an appropriate voltage and frequency.

The VSG converter 52 enables the IC engine 14 to run at a variable speed such that, at times of low power demand on the power grid, the IC engine can run at low speeds rather than rated speed thus saving on fuel consumption. As described earlier, it may also reduce emissions, noise production, and wear and tear of the genset. In this embodiment, the controller 24 commands the speed response of the engine depending on the power output of the VSG converter 52. This embodiment represents an improvement but a continuing challenge is that the optimal engine speed for fuel efficiency is often a speed where the output power of the engine is limited and close to that of the loads. If the load demand spikes much above normal levels, then there is little additional torque available to accelerate the engine to the required new speed for the higher power level. In one embodiment, the additional energy storage device 20 may be used to accommodate the transient response scenario. As described earlier, the energy storage device 20 is charged or discharged through the ES converter 22 during times of transient load change to reduce the impact of load changes on the genset. The controller 24 provides control signals 26 to the ES converter 22 to control its output voltage. Transformers 34 and 36 may be used to match the output voltage of the VSG converter 52 and the ES converter 22 to the grid voltage. In one embodiment (not shown), the output of the ES converter 22 may be directly connected to the output of the VSG converter 52 instead of to the grid 18 through the transformer 36. This avoids the expense for an additional transformer connection between the ES converter and the grid.

Figure 3:
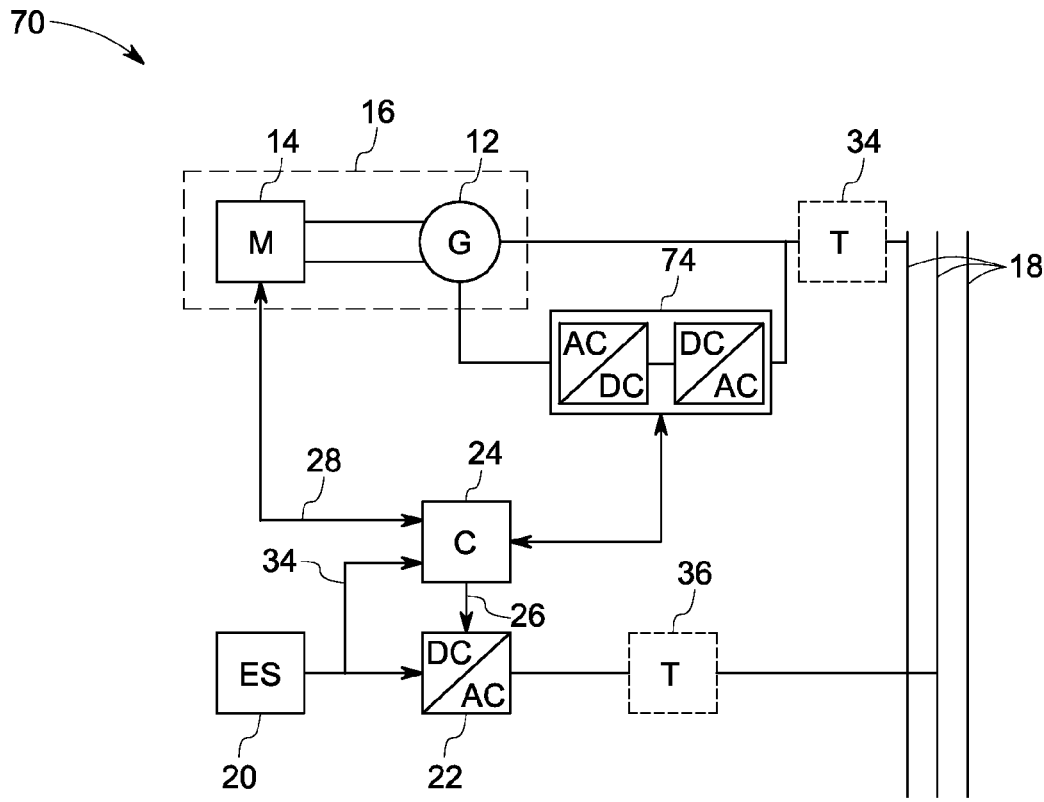
FIG. 3 is a diagrammatical representation of a variable speed genset system with a Doubly Fed Asynchronous Generator (DFAG) and an energy storage device in accordance with an embodiment of the present invention.

FIG. 3 shows a variable speed genset system 70 with a Doubly Fed Asynchronous Generator (DFAG) and an energy storage device for transient response in accordance with an embodiment of the present invention. In the embodiment of FIG. 3, the genset 16 includes a DFAG machine 72 with a DFAG converter 74 connected between the DFAG machine stator and the rotor. The DFAG machine may also be referred to as a Doubly Fed Induction Generator (DFIG). As will be appreciated by those skilled in the art, the DFAG machine or the DFIG machine is an asynchronous machine with multiphase windings on the stator and the rotor. The stator and rotor windings participate actively in the electrical energy conversion process. The rotor winding is connected to the grid via a DFAG converter and the stator winding is connected directly to the grid. The advantage of a DFAG machine is that the rating of the DFAG converter 74 is typically one third of the full power rating of the DFAG machine 72. The DFAG converter 74 enables the output frequency of the DFAG machine to remain constant despite variations of approximately +/−30% in the DFAG machine speed. The advantage of using the DFAG machine and the DFAG converter is that, due to the reduction of power rating of the converter, the costs associated with the genset system are considerably lower than for a fully rated converter genset system such as might be used in the embodiment of FIG. 2. As described earlier, in one embodiment, the transformer 36 may be eliminated by directly connecting the ES converter output to the input of transformer 34.

Figure 4:
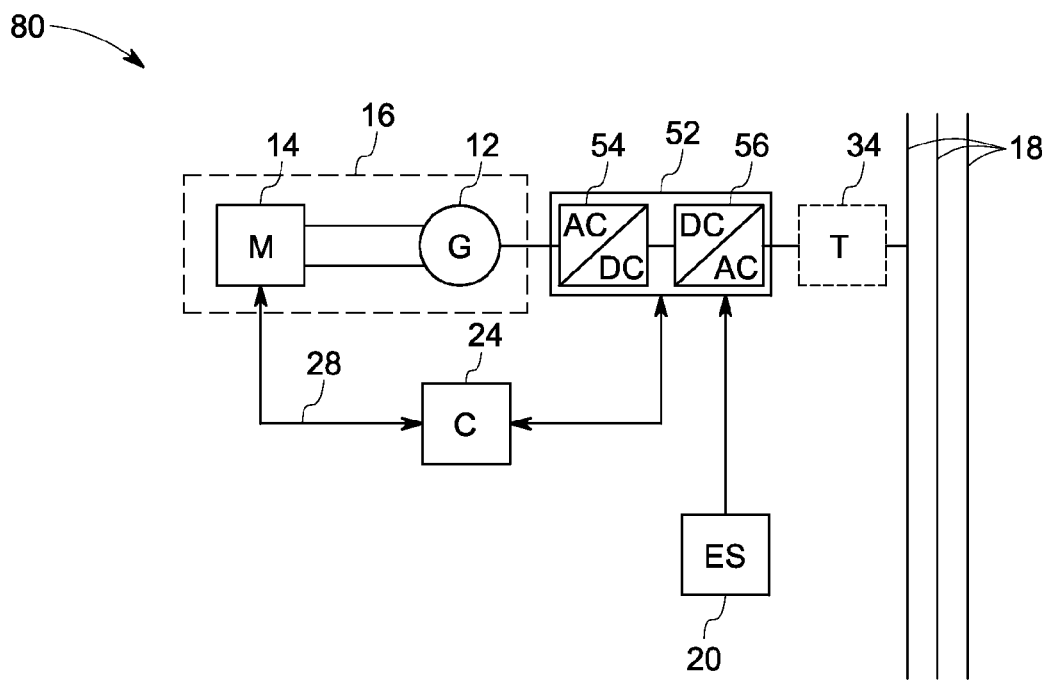
FIG. 4 is a diagrammatical representation of a variable speed genset system with an energy source in accordance with an embodiment of the present invention.

FIG. 4 is a diagrammatical representation 80 of the variable speed genset system with an energy source in accordance with an embodiment of the present invention. In the embodiment of FIG. 4, the energy storage device is directly connected to a DC bus (not shown) of the VSG converter 52. The advantage of this configuration is that it helps in eliminating an extra DC/AC conversion stage represented by converter 22 of FIG. 2. In one embodiment, the synchronous generator 12 and the VSG converter 52 may be replaced by the asynchronous generator 72 and a DFAG converter 74 of FIG. 3.

Figure 5:
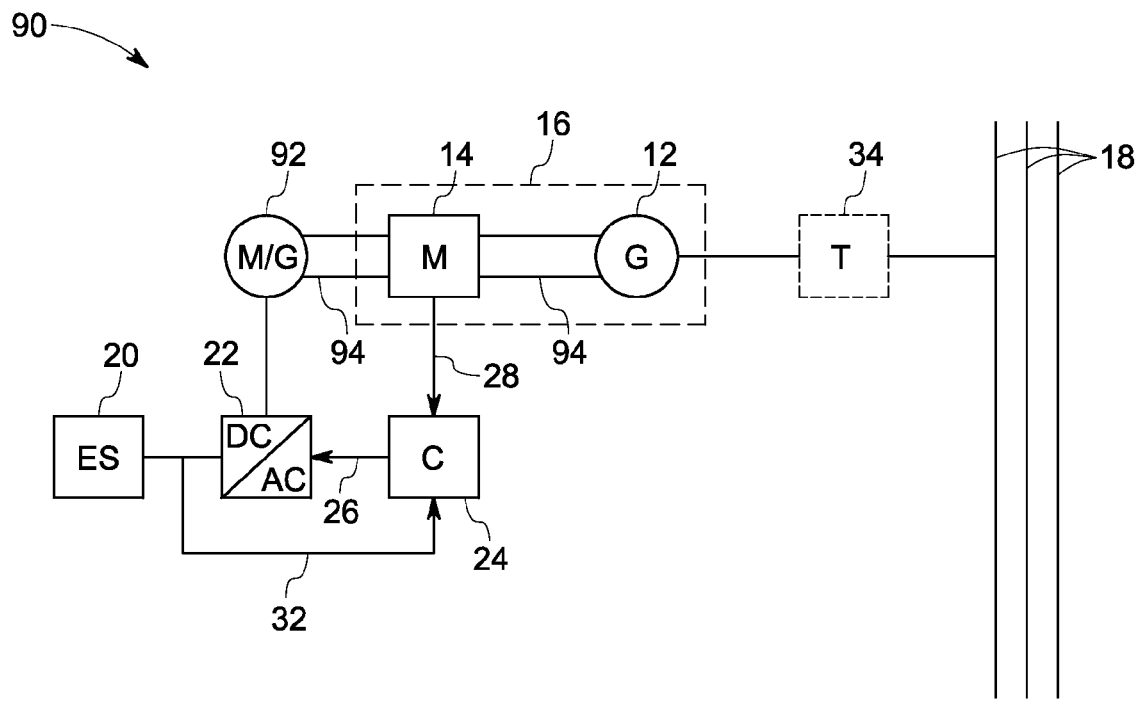
FIG. 5 is a diagrammatical representation of a genset system with an auxiliary machine for transient response in accordance with an embodiment of the present invention.

FIG. 5 shows a genset system 90 with an auxiliary machine for transient response in accordance with another embodiment of the present invention. In the embodiment of FIG. 5, an electrical motor-generator (M/G) set 92 is mechanically coupled to the crankshaft 94 of the IC engine 14, and the energy storage converter 22 is electrically connected to the M/G set instead of the power grid 18. The M/G set is controlled by the controller 24 such that if the load on the power grid 18 increases resulting in a decrease in the genset speed, the M/G set 92 is driven in a motoring mode to supply additional torque to the genset 16 and thus maintain the genset speed. In the motoring mode, the energy to drive the M/G set 92 is obtained by discharging the energy storage device 20. On the other hand if the load on the power grid 18 decreases and results in engine overspeed, the controller 24 controls the M/G set 92 to operate in a generating mode providing a breaking torque on the crankshaft 94 of the genset. In the generating mode, the energy generated by the M/G set 92 is utilized to charge the energy storage device 20. An advantage of the system 90 is that no additional connection of the energy storage device 20 to the grid 18 is required and the ES converter voltages can be adapted to the rating of the M/G set 92, which could be potentially lower than the grid voltage and therefore less expensive. In one embodiment, the M/G set 92 is rated at a fraction of the size of the asynchronous generator 72. In one embodiment, the M/G set includes an AC motor and the ES converter includes a AC to DC converter to convert DC power from the energy storage device to AC power and feed it to the AC motor of the M/G set. In another embodiment, the M/G set includes a DC motor and the ES converter includes a DC to DC converter to feed the DC power to the DC motor of the M/G set.

Figure 6:
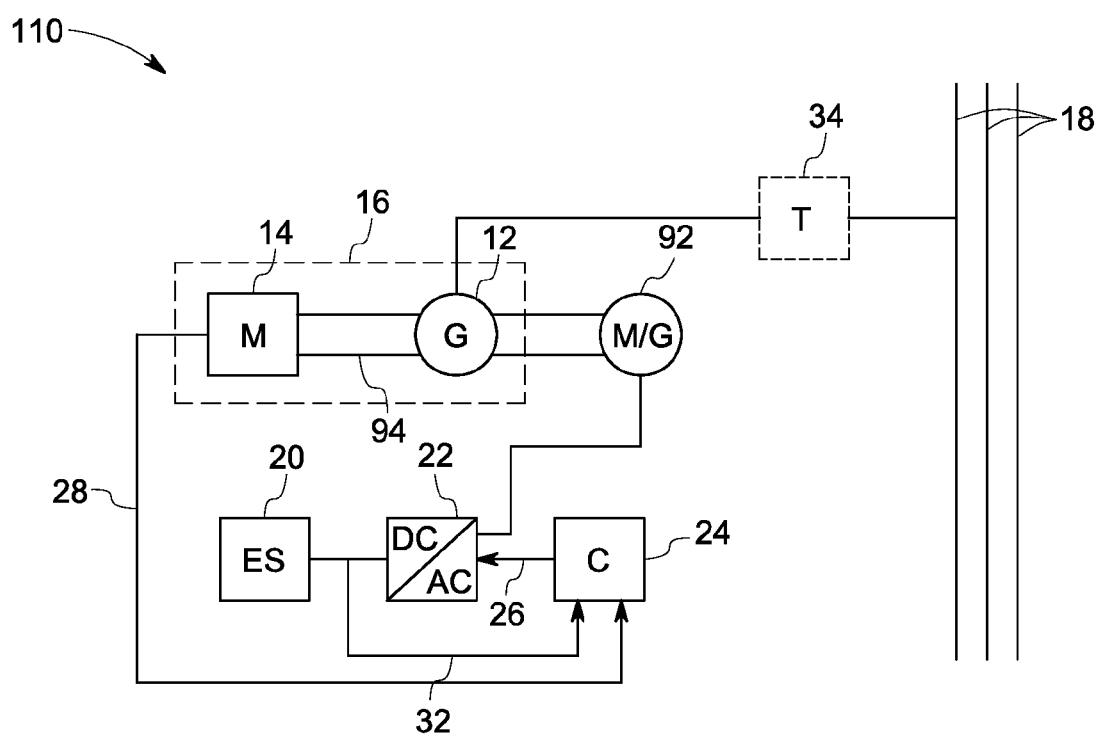
FIG. 6 is another diagrammatical representation of a genset system with an auxiliary machine for transient response in accordance with an embodiment of the present invention.
Figure 7:
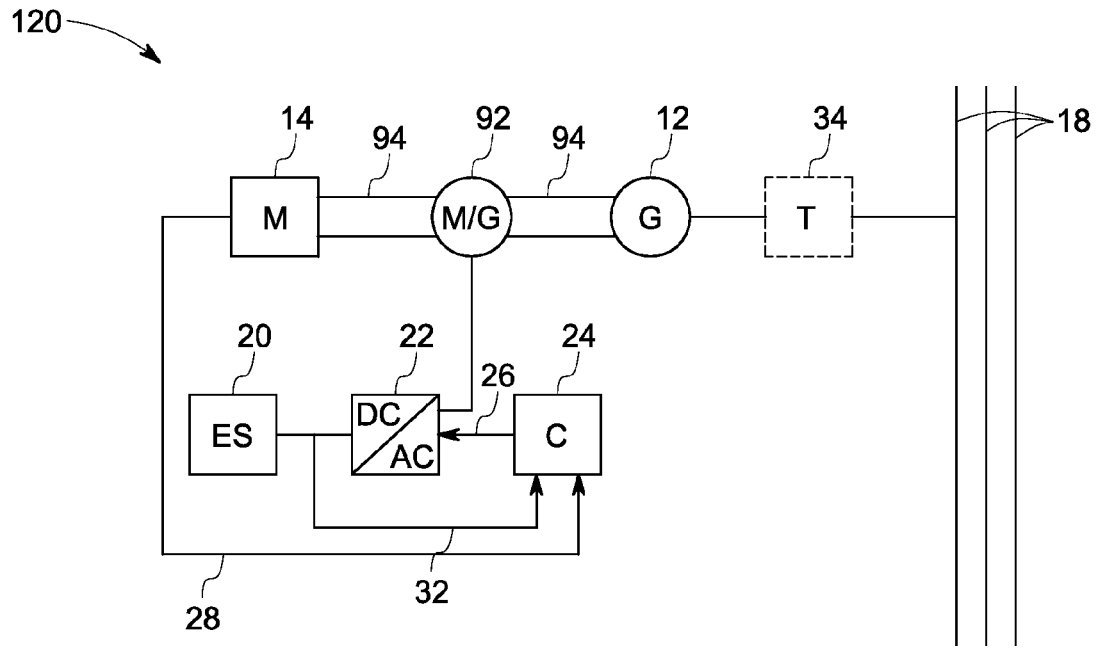
FIG. 7 is yet another diagrammatical representation of a variable speed genset system with an auxiliary machine for transient response in accordance with an embodiment of the present invention.

FIG. 6 shows a genset system 110 with an auxiliary machine for transient response in accordance with an embodiment of the present invention. In the embodiment of FIG. 6, as compared to FIG. 5, the M/G set is located at a different position on the crankshaft 94 of the genset Similarly, FIG. 7 shows a genset system 120 with an auxiliary machine for transient response in accordance with an embodiment of the present invention. In the embodiment of FIG. 7, as compared to FIG. 5, the M/G set is located in between the IC engine and the generator on the crankshaft of the genset.

Figure 8:
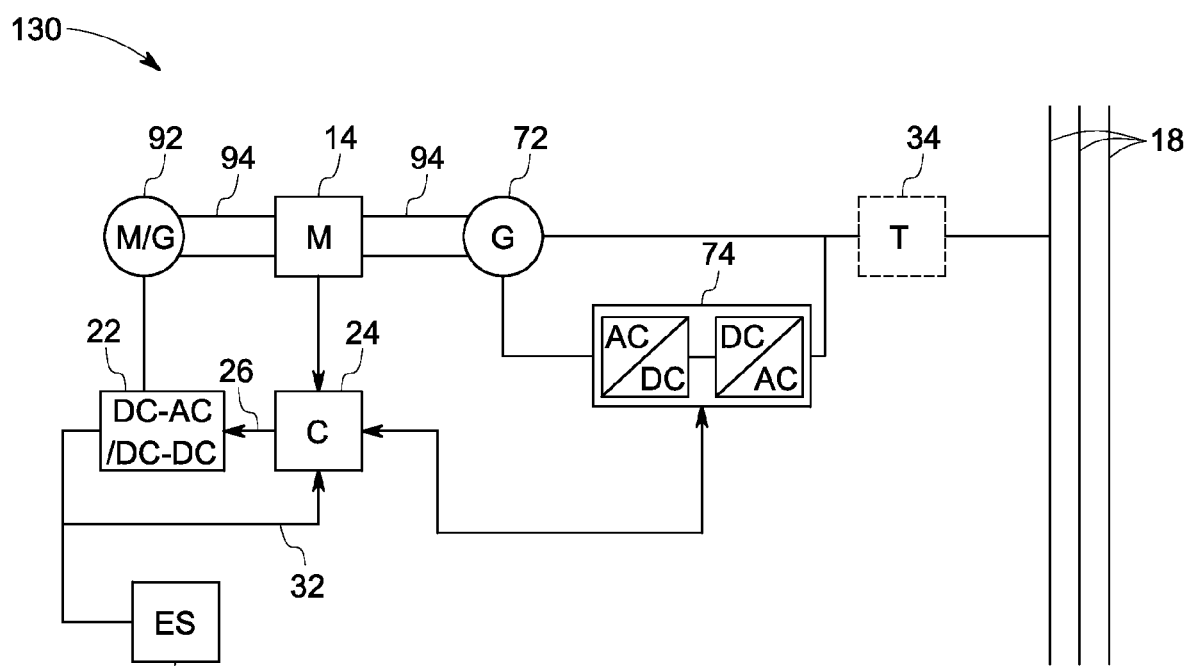
FIG. 8 is a diagrammatical representation of a variable speed genset system with an auxiliary machine for transient response in accordance with an embodiment of the present invention.

FIG. 8 shows a variable speed genset system 130 with an auxiliary machine for transient response in accordance with another embodiment of the present invention. The system 130 is similar to the system 90 of FIG. 5. However, a DFAG machine 72 and a DFAG converter 74 are used in system 130. Thus, compared to genset system 90, there is also a flexibility of controlling speed of the engine 14. In one embodiment, the DFAG machine and DFAG converter may be replaced by a synchronous machine and a VSG converter as described earlier.

In embodiments wherein existing gensets use an external electric starter motor (not shown) for black start capability, the M/G set 92, the ES converter 22 and the energy source device 20 could replace such electric starters with a potential for slightly uprated capability in exchange for the modest additional cost of these components as compared to starter motors. As with earlier configurations, the transformer 34 may be used in the case that the output voltage of the generator 72 does not match the grid voltage.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generating system comprising
a variable speed genset comprising an engine and a variable speed generator mechanically coupled to the engine and configured to generate electrical power;
an energy storage device configured to be charged or discharged during transient load conditions of a power grid;
a controller to generate a speed control signal to select a speed for the genset based upon stored energy in the energy storage device and power generating system conditions, power grid conditions, or combinations thereof;
a first converter to couple the variable speed genset and the energy storage device to the power grid; and
a second converter configured to couple the energy storage device to the power grid, wherein the controller is configured to send storage control signals to the second converter so as to charge the energy storage device during lower than normal transient load conditions and discharge the energy storage device during higher than normal transient load conditions,
wherein the second converter is connected to the power grid through a transformer.

2. The system of claim 1, wherein the engine comprises a natural gas engine or a diesel engine.

3. The system of claim 1, wherein the variable speed generator comprises a synchronous generator or a doubly fed asynchronous generator.

4. The system of claim 1, wherein the energy storage device comprises a supercapacitor or a battery storage device or a direct current (DC) flywheel.

5. The system of claim 1, wherein the speed control signal comprises an engine speed control signal.

6. The system of claim 1, wherein the first converter comprises a rectifier stage and an inverter stage.

7. The system of claim 1, wherein the second converter comprises an inverter stage.

8. The system of claim 1, wherein the first converter is connected to the power grid through a transformer.

9. The system of claim 1, wherein the first converter and second converter are connected to the power grid through a common transformer.

10. A power generating system comprising
a variable speed genset comprising an engine and a variable speed generator mechanically coupled to the engine and configured to generate electrical power;
an energy storage device configured to be charged or discharged during transient load conditions of a power grid; and
a controller to generate a speed control signal to select a speed for the genset based upon stored energy in the energy storage device and power generating system conditions, power grid conditions, or combinations thereof,
wherein the variable speed genset further comprises an auxiliary machine mechanically coupled to the engine; and
a converter configured to couple the energy storage device to the auxiliary machine, wherein the speed control signal comprises an auxiliary machine control signal and is transmitted through the converter.

11. The system of claim 10, wherein the variable speed generator comprises a synchronous generator or a doubly fed asynchronous generator.

12. The system of claim 10, wherein the auxiliary machine comprises a motor-generator set.

13. The system of claim 12, wherein the motor comprises a direct current machine or an alternating current machine.

14. The system of claim 10, wherein the controller is configured to send control signals to the converter so as to drive the auxiliary machine in a motoring mode during lower than normal transient loads and to drive the auxiliary machine in a generating mode during higher than normal transient loads on the power grid.

15. The system of claim 10, wherein the converter comprises a direct current to direct current converter or an inverter.

16. A power generating system comprising
a variable speed genset comprising an engine and a variable speed generator mechanically coupled to the engine and configured to generate electrical power;
an energy storage device configured to be charged or discharged during transient load conditions of a power grid;
a controller to generate a speed control signal to select a speed for the genset based upon stored energy in the energy storage device and power generating system conditions, power grid conditions, or combinations thereof; and
a converter configured to couple the variable speed generator to a power grid,
wherein the energy storage device is coupled to the converter.

17. The system of claim 16, wherein the energy source is coupled to a direct current (DC) link of the converter.

18. A power generating system comprising
a genset comprising an engine and a generator mechanically coupled to the engine and configured to generate electrical power;
an energy storage device configured to be charged or discharged during transient load conditions of a power grid;
an auxiliary machine mechanically coupled to the engine;
a converter configured to couple the energy storage device to the auxiliary machine; and
a controller to generate a converter control signal to control supply of power from the energy storage device to the auxiliary machine based upon stored energy in the energy storage device and power generating system conditions, power grid conditions, or combinations thereof.

19. The system of claim 18, wherein the auxiliary machine comprises a motor-generator set.

20. The system of claim 19, wherein the motor comprises a direct current machine or an alternating current machine.

21. The system of claim 18, wherein the controller is configured to send control signals to the converter so as to drive the auxiliary machine in a motoring mode during lower than normal transient loads and to drive the auxiliary machine in a generating mode during higher than normal transient loads on the power grid.

* * * * *